United States Patent [19]

Britain

[11] 3,926,895

[45] Dec. 16, 1975

[54] LIQUID PLASTIC REPAIR COMPOSITION AND METHOD

[75] Inventor: Cecil E. Britain, Wichita, Kans.

[73] Assignees: Muriel M. Britain; Charles F. Dickinson; Ryta M. Dickinson; Norva M. Bump, all of Wichita, Kans.

[22] Filed: Nov. 29, 1973

[21] Appl. No.: 419,139

[52] U.S. Cl... 260/30.4 R; 260/30.6 R; 260/31.2 R; 260/31.8 G; 260/31.8 H; 260/32.8 R; 260/33.6 UA; 260/45.75 T; 264/36

[51] Int. Cl.$^2$... C08K 5/07; C08K 5/09; C08K 5/10; C08K 5/15

[58] Field of Search ... 260/30.4 R, 45.75 K, 32.8 R, 260/31.2 R, 33.6 UA, 31.8 G, 31.8 H, 45.75 T; 117/2 R; 264/36

[56] References Cited
UNITED STATES PATENTS

| | | | |
|---|---|---|---|
| 2,481,086 | 9/1949 | Cleverdon et al. | 260/47.75 K |
| 2,770,611 | 11/1956 | Nitzsche et al. | 260/47.75 K |
| 3,804,685 | 4/1974 | Jacoby et al. | 264/36 |
| 3,810,801 | 5/1974 | Speer | 117/2 R |

*Primary Examiner*—Allan Lieberman
*Attorney, Agent, or Firm*—John H. Widdowson

[57] ABSTRACT

A plastic repair composition of matter and process for making same. The repair composition comprises a major proportion of a first solvent selected from the group consisting of methyl ethyl ketone, methyl isobutyl ketone, acetone, cyclohexanone, isophorone, ethyl acetate, butyl acetate, xylol, toluene, toluol, amyl acetate, and mixtures thereof. The repair composition additionally includes a minor proportion of a mixture including a second solvent having the formula:

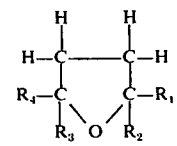

wherein $R_1$, $R_2$, $R_3$ and $R_4$ are selected from the group consisting of hydrogen, alkyl hydrocarbons containing from between 1 to 6 carbon atoms, and mixtures thereof, a plasticizer selected from the group consisting of tricresyl phosphate, dioctyl phthalate, and mixtures thereof, a synthetic vinyl polymer resin product selected from the group consisting of vinyl chloride, vinyl acetate, polyvinyl chloride, polyvinyl acetate, and mixtures thereof, and dibutyl tin dilaurate having between about 17 and 20 percent weight tin.

12 Claims, No Drawings

LIQUID PLASTIC REPAIR COMPOSITION AND METHOD

BACKGROUND OF THE INVENTION

1. Field of the Invention

This invention relates to a plastic repair composition of matter. More specifically, this invention provides a novel liquid vinyl repair composition of matter and a process for making same.

2. Description of the Prior Art

It is generally old in the art of plastic repair matter to have a vinyl repair composition of matter which includes vinyl resins, a solvent for the vinyl resins comprising tetrahydrafuran or ketones, a plasticizer compound for maintaining the matter soft and viscous to prevent cracking, and a light stabilizer for stabilizing the vinyl resin repair matter to light. However, such prior art light stabilizers as esters of 7-oxabicyclo (2,2,1)-5-heptene 2, 3-dicarboxylic anhydride and alkyl esters of the same in combination with vinyl resins, resinous solvents, and plasticizers produce an undesirable finish because of a milky appearance. The prior art light stabilizers are also somewhat expensive and have to be meticulously mixed with vinyl resinous compounds to improve the stability of these polymers to light. Therefore, what is needed and what has been invented by me is a novel liquid vinyl repair composition of matter having a combination of elements which produce unobvious effects without the foregoing deficiencies.

SUMMARY OF THE INVENTION

It is therefore an object of this invention to provide a novel vinyl repair composition of matter which offers a clear and transparent finish.

It is another object of this invention to provide a novel process for manufacturing the novel vinyl repair composition of matter.

It is yet another object of this invention to provide an economical process for producing an inexpensive novel vinyl repair composition of matter whose effects do not offer the foregoing deficiencies associated with the prior art.

Still other objects will be apparent to those skilled in the art from the following description of this invention.

The foregoing objects are achieved according to the practice of this invention. Broadly, this invention provides a plastic repair composition of matter comprising a major proportion of a first solvent selected from the group consisting of methyl ethyl ketone, methyl isobutyl ketone, acetone, cyclohexanone, isophorone, ethyl acetate, butyl acetate, xylol, toluene, toluol, amyl acetate, and mixtures thereof, and a minor proportion of a mixture including a second solvent having the formula:

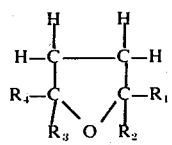

wherein $R_1$, $R_2$, $R_3$ and $R_4$ are selected from the group consisting of hydrogen, alkyl hydrocarbons containing from between 1 to 6 carbon atoms, and mixtures thereof. The mixture also includes a plasticizer selected from the group consisting of tricresyl phosphate, dioctyl phthalate, dibutyl phthalate, and mixtures thereof, a synthetic vinyl polymer resin product selected from the group consisting of vinyl chloride, vinyl acetate, polyvinyl chloride, polyvinyl acetate, and mixtures thereof, and dibutyl tin dilaurate having between about 17 and 20 percent weight tin. The method of manufacturing this plastic repair composition of matter comprises adding to a mixing zone a solvent including per each about 37 parts by volume of the plastic repair composition from about 5 to about 15 parts by volume of the second solvent having the formula:

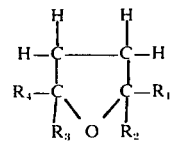

wherein $R_1$, $R_2$, $R_3$, $R_4$ are selected from the group consisting of hydrogen, alkyl hydrocarbons containing from between 1 to 6 carbon atoms, and mixtures thereof, and from between about 9 to about 31 parts by volume of the first solvent. After the first and second solvents are blended, from between about 1 part to about 4 parts by volume of dibutyl tin dilaurate including between 17 and 20 percent weight tin per 37 parts by volume of the repair composition is admixed to the mixture of the first and second solvent while simultaneously stirring same. Subsequently, the method additionally includes blending to the mixture of first solvent, second solvent, and dibutyl tin dilaurate, the synthetic vinyl polymer resin comprising from between about 45 pounds to about 65 pounds per 37 gallons of the plastic repair composition; the polymer has a molecular weight of about 34,800 and includes about 90 percent weight of polyvinyl chloride and about 10 percent weight of polyvinyl acetate. The final step in the method is to mix with foregoing mixture while simultaneously stirring from between about 5 pounds to about 15 pounds of the plasticizer per 37 gallons of the plastic repair composition.

Thus by the practice of this invention there is provided a novel plastic repair composition of matter and a process for manufacturing same which are relatively economical and are not subjected to the deficiencies associated with the prior art.

DETAILED DESCRIPTION OF THE INVENTION

The liquid plastic repair composition of matter of my invention includes a vinyl resin compound, a plasticizer, a light stabilizer, and a solvent for the resinous mixture. The solvent may be any suitable type of solvent capable of bringing the vinyl resin compound into an appropriate solvent resin mixture which can be easily spread. The preferred solvents for the polymer vinyl resin compound are those which have a high evaporation rate such as those selected from the group consisting of methyl ethyl ketone, methyl isobutyl ketone, acetone, cyclohexanone, isophorone, ethyl acetate, butyl acetate, xylol, toluene, toluol, amyl acetate, and mixtures thereof. The more preferred solvent is a mixture of methyl ethyl ketone, acetone, and methyl isobutyl ketone. A preferred mixing proportion for the solvent has been found to be from between about 9 to about 31 parts by volume per 37 parts by volume of my novel liquid plastic repair composition. If the more preferred solvent mixtures is used, I have found that the best mixing proportion per each 37 parts by volume of plastic repair composition is about 10 parts by volume of methyl ethyl ketone and about 5 parts by volume each of acetone and methyl isobutyl ketone.

It has been discovered that if the solvent is admixed with a second solvent having the formula:

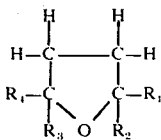

wherein $R_1$, $R_2$, $R_3$ and $R_4$ are selected from the group consisting of hydrogen, alkyl hydrocarbons containing from between 1 to 6 carbon atoms, and mixtures thereof, the dissolving characteristics of the solvent mixture are greatly improved. Preferably, per each 37 parts by volume of plastic repair composition from between about 5 to about 15 parts by volume of the second solvent should be mixed with the solvent. If the more preferred solvent mixture of methyl ethyl ketone, acetone, and methyl isobutyl ketone is utilized, then more preferably the second solvent is tetrahydrafuran ($R_1$, $R_2$, $R_3$ and $R_4$ are hydrogen) and comprises about 10 parts by volume per 37 parts by volume of the repair composition.

A plasticizer is added to my novel plastic repair composition to keep the polymer mixture soft and viscous, and to prevent cracking when it hardens. The plasticizer may be any suitable plasticizer such as tricresyl phosphate, dioctyl phthalate, dibutyl phthalate, or mixtures thereof; and may be added in a concentration of from between about 5 pounds to about 15 pounds per 37 gallons of plastic repair composition. In aa preferred embodiment of the invention the plasticizer is dioctyl phthalate and about 9 pounds should be blended with each 37 gallons of repair composition to yield the best results.

The vinyl resin compound may be any suitable synthetic vinyl polymer resin product or vinylites. Preferably, the vinyl resin compound is selected from the group consisting of vinyl chloride, vinyl acetate, polyvinyl chloride, polyvinyl acetate, and mixtures thereof, and includes a concentration of from between about 45 pounds to about 65 pounds of resin per 37 gallons of the liquid plastic repair composition. In a preferred embodiment of the invention the synthetic vinyl polymer resin product comprises a major proportion of the polyvinyl chloride and a minor proportion of the polyvinyl acetate with a concentration which comprises about 56 pounds per 37 gallons of the plastic repair composition. This preferred polymer resin has a molecular weight of about 34,800, a specific gravity of $1.36 \pm 0.005$, and a density (lbs./cu. ft.) of about 24. The percent weight of polyvinyl chloride may be from between about 88 to about 91, but is preferably about 90. This preferred resin provides my novel plastic repair composition with the maximum in physical properties such as tensile strength, abrasion and elongation resistance. The preferred resin compound can also tolerate high plasticizer concentrations without becoming tacky, and is ideally suited for straight ketone solvents and tetrahydrafuran.

The most important constituent of my novel plastic repair composition of matter is the light stabilizer. I have discovered that the light stabilizer, dibutyl tin dilaurate, in combination with the aforementioned preferred compounds and mixing proportions produces a liquid vinyl repair composition of matter which when applied hardens and produces a clearer and more transparent finish than that taught by the prior art. The dibutyl tin dilaurate may contain from between about 17 and 20 percent weight tin, but preferably comprises about 18.6 percent weight of tin. The physical or chemical properties of specific gravity, refractive index and melting point of the dibutyl tin dilaurate utilized by me are preferably 1.04, 1.46, and 20° C, respectively. The dibutyl tin dilaurate with these preferred properties may be combined with the previously mentioned components in a mixing range of between about 1 part to about 4 parts by volume of dibutyl tin dilaurate per 37 parts by volume of the liquid repair composition. In a preferred embodiment, the dibutyl tin dilaurate having about 18.6 percent weight of tin has a concentration of about 2.5 parts by volume per 37 parts by volume of the liquid plastic repair. Utilization of the preferred dibutyl tin dilaurate in combination with the preferred aforementioned components and mixing proportions produces a brilliantly clear vinyl product having good weathering and heat sealing properties as never before seen by the prior art. No milky appearance is presented in the product.

In the following is set forth examples of the manufacturing and applying of my novel liquid plastic repair composition of matter to produce unobvious and better results than disclosed by the prior art; these examples are given by way of illustration and not by limitation. The specific concentrations, temperatures, times, compounds, etc., set forth in these examples are not to be construed to unduly limit the scope of my invention.

EXAMPLE 1

A 37 gallon batch of my more preferred novel plastic repair composition of matter was prepared by mixing the following components and amounts:

| | |
|---|---|
| Tetrahydrafuran | 10 gallons |
| Methyl Ethyl Ketone | 10 gallons |
| Acetone | 5 gallons |
| Methyl Isobutyl Ketone | 5 gallons |
| Dibutyl tin dilaurate (18.6% Sn) | 2½ gallons |
| Vinyl chloride-Vinyl acetate copolymer resin (90% weight vinyl chloride, M.W. ≅ 34,800) | 56 pounds |
| Dioctyl Phthalate | 9 pounds |

In preparing the composition, the four solvents (tetrahydrafuran, methyl ethyl ketone, acetone, methyl isobutyl ketone) were added to a 55 gallon mixing zone and mixed at room temperature and atmospheric pressure. While the foregoing quantities for the solvents are the most preferred, it should be pointed out that from about 5 to about 15 parts by volume each of tetrahydrafuran and methyl ethyl ketone, and from about 2 to about 8 parts by volume each of acetone and methyl isobutyl ketone had worked.

After the solvents were thoroughly mixed 2 ½ gallons of the dibutyl tin dilaurate were admixed thereto while simultaneously stirring the 55 gallon mixing zone with a mixer impeller at between about 100 and 500 r.p.m. (preferably at 300 r.p.m.). The length of time it takes to mix the solvents together and the solvents with the light stabilizer (dibutyl tin dilaurate) depends on the amount of agitation. In general, it was found that stirring at 300 r.p.m. took from between about 2 minutes to about 10 minutes to mix all of the foregoing components.

Subsequent to thoroughly mixing the solvents and the light stabilizers and while simultaneously stirring same at about 300 r.p.m., the vinyl resin copolymer was blended thereto. The blending step took from between about 2 minutes to about 10 minutes.

The final step was a slowly add at a rate of about 1 pound to every 2 to 3 minutes the plasticizer (dioctyl phthalate) while simultaneously stirring at 300 r.p.m. It was discovered the addition rate of plasticizer to the mixture also depended on the stirring rate and could be determined by anyone possessing ordinary skill in the art.

The mixture was bottled immediately and was utilized to repair a 2-inch hole in a plastic chair cover. A 2 ½-inch to a 3-inch subpatch was placed in the hole such as to have the circumferential area of the patch easily circumscribe the underneath edges of the hole. The subpatch was composed of my novel plastic repair composition and was tacked to the underneath edges of the hole by placing a quantity of the liquid plastic repair matter along the circumferential area and compressing against the underneath edges of the hole. The hardening action of the liquid plastic repair composition was one similar to welding; it partially dissolved the vinyl resin along the torn hole and enabled additional plastic repair filler to be added on the top surface of the subpatch. The plastic repair filler was my novel composition and was smoothed on its surface such as to have its surface aligned with the surface of the plastic chair cover. After drying a perfectly clear and beautiful repair resulted which was painted the same color of the chair cover to blend therewith.

EXAMPLE II

A 37-gallon batch of my novel liquid plastic repair composition of matter is prepared as was done in EXAMPLE 1. A 1/16-inch cut in a vinyl plastic upholstery material is repaired by merely placing some of the liquid plastic repair along the edges and with the cut. The repair liquid is leveled with the surface of the upholstery, and a piece of tape is transversely placed across the cut to hold the edges thereof together while blending takes place. Numerous similar repairs are done with prior art plastic repair matters such as VINYL CEMENT, distributed by Montgomery Ward & Co., Inc., DAB vinyl plastic repair, a trademark of Hollingshead Corp., and FORMULA-V, distributed by Woodhill Chemical Sales Corp. of Cleveland, Ohio. The tests are repeated for upholstery material made out of leather and canvas. The results are that in all cases my novel plastic repair matter yielded a clearer and a stronger bonding than all prior art plastic repair matters.

The foregoing examples illustrate that my novel liquid plastic repair composition of matter (and process for manufacturing same) accomplishes the previously mentioned objects of the invention. Also, it was determined upon completion of the examples that the most preferred components and mixing quantities of same yielded results which were far more superior than what is taught by the prior art.

While the present invention has been described herein with reference to particular embodiments thereof, and specific examples, a latitude of modification, various changes and substitutions are intended in the foregoing disclosure, and in some instances some features of the invention will be employed without a corresponding use of other features without departing from the scope of the invention as set forth.

I claim:

1. A plastic repair composition of matter comprising a major proportion of a first solvent selected from the group consisting of methyl ethyl ketone, methyl isobutyl ketone, acetone, cyclohexanone, isophorone, ethyl acetate, butyl acetate, xylol, toluol, amyl acetate, and mixtures thereof, and a minor proportion of a mixture including a second solvent having the formula:

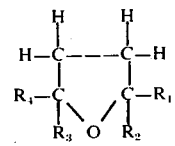

wherein $R_1$, $R_2$, $R_3$ and $R_4$ are selected from the group consisting of hydrogen, alkyl hydrocarbons containing from between 1 to 6 carbon atoms, and mixtures thereof, a plasticizer selected from the group consisting of tricresyl phosphate, dioctyl phthalate, dibutyl phthalate, and mixtures thereof, a synthetic vinyl copolymer resin product comprising about 90 percent weight vinyl chloride, about 10 percent weight vinyl acetate, and has a molecular weight of about 34,800, and dibutyl tin dilaurate having between about 17 and 20 percent weight tin, said first solvent comprises from between about 9 to about 31 parts by volume per 37 parts by volume of said plastic repair composition, said second solvent comprises from between about 5 to about 15 parts by volume per 37 parts by volume of said plastic repair composition, said dibutyl tin dilaurate comprises from between about 1 part to about 4 parts by volume per 37 parts by volume of said repair composition, said synthetic vinyl copolymer resin product comprises from between approximately 45 pounds to about 65 pounds per 37 gallons of said plastic repair composition, and said repair composition is characterized by a clear and transparent finish.

2. The plastic repair composition of claim 1 wherein said first solvent comprises approximately 10 parts by volume of methyl ethyl ketone, 5 parts by volume of acetone, and 5 parts by volume of methyl isobutyl ketone.

3. The plastic repair composition of claim 1 wherein said second solvent comprises about 10 parts by volume per 37 parts by volume of said plastic repair composition, and said $R_1$, $R_2$, $R_3$ and $R_4$ are hydrogen.

4. The plastic repair composition of claim 1 wherein said dibutyl tin dilaurate includes about 18.6 percent weight of said tin and comprises about 2.5 parts by volume per 37 parts by volume of said repair composition.

5. The plastic repair composition of matter of claim 1 wherein said plasticizer comprises from between about 5 pounds to about 15 pounds per 37 gallons of said plastic repair composition.

6. The plastic repair composition of matter of claim 5 wherein said plasticizer is dioctyl phthalate and comprises about 9 pounds per 37 gallons of said plastic repair composition.

7. The plastic repair composition of matter of claim 1 wherein about 37 gallons of said repair composition comprises about 10 gallons of tetrahydrafuran, about 10 gallons of methyl ethyl ketone, approximately 5 gallons of said acetone, about 5 gallons of said methyl isobutyl ketone, about 2.5 gallons of said dibutyl tin dilaurate having about 18.6 percent weight of tin, about 9 pounds of said dioctyl phthalate, and approximately 56 pounds of said synthetic vinyl copolymer resin product.

8. A method of manufacturing a plastic repair composition of matter comprising
   a. adding to a mixing zone a solvent including per each about 37 parts by volume of said plastic repair composition from about 5 to about 15 parts by volume of tetrahydrafuran, from about 5 to about 15 parts by volume of methyl ethyl ketone, from about 2 to about 8 gallons of acetone, and from about 2 to about 8 gallons of methyl isobutyl ketone;
   b. admixing per each about 37 parts by volume of said repair composition from between about 1 part to about 4 parts by volume of dibutyl tin dilaurate including about 18.6 percent weight tin, said admixing being accomplished while simultaneously stirring said solvent of step (a);
   c. blending to the mixture of step (b) while simultaneously stirring same a synthetic vinyl copolymer resin comprising from between about 45 pounds to about 65 pounds per about 37 gallons of said plastic repair composition, said polymer resin having a molecular weight of about 34,800 and including about 90 percent weight of vinyl chloride and about 10 percent weight of vinyl acetate; and
   d. adding to the mixture of step (c) while simultaneously stirring same from between about 5 pounds to about 15 pounds of dioctyl phthalate per about 37 gallons of said plastic repair composition.

9. The method of claim 8 wherein said solvent per each 37 parts by volume of said repair composition comprises about 10 parts by volume of said tetrahydrafuran, about 10 parts by volume of said methyl ethyl ketone, about 5 parts by volume of said acetone, and about 5 parts by volume of said methyl isobutyl ketone.

10. The method of claim 9 wherein said dibutyl tin dilaurate including about 18.6 percent weight tin comprises about 2.5 parts by volume per 37 parts by volume of said repair composition.

11. The method of claim 10 wherein said copolymer resin comprises about 56 pounds per about 37 gallons of plastic repair composition.

12. The method of claim 11 wherein said dioctyl phthalate comprises about 9 pounds per about 37 gallons of said plastic repair composition.

* * * * *